United States Patent
Yang et al.

(10) Patent No.: US 6,309,568 B1
(45) Date of Patent: Oct. 30, 2001

(54) PROCESS METHOD OPTICAL THERMOPLASTIC URETHANE RESIN LENS AND THE LENS

(75) Inventors: Zhou Yang, Milford; Zhenya Zhu, Stratford; Yin-Nian Lin, Milford, all of CT (US); Tadashi Kobayashi; Yuyoshi Saito, both of Fukui (JP)

(73) Assignees: Asahi Lite Optical Co., Ltd., Fukui (JP); Optima Inc., Milford, CT (US)

( * ) Notice: Subject to any disclaimer, the term of this patent is extended or adjusted under 35 U.S.C. 154(b) by 0 days.

(21) Appl. No.: 09/402,756
(22) PCT Filed: Apr. 17, 1998
(86) PCT No.: PCT/JP98/01764
    § 371 Date: Oct. 27, 1999
    § 102(e) Date: Oct. 27, 1999
(87) PCT Pub. No.: WO98/47694
    PCT Pub. Date: Oct. 29, 1998

(30) Foreign Application Priority Data

Apr. 21, 1997 (JP) .................................. 9-103483

(51) Int. Cl.$^7$ ........................................ B29D 11/00
(52) U.S. Cl. .............. 264/1.7; 264/2.7; 264/85
(58) Field of Search .................. 264/1.1, 2.4, 2.7, 264/2.2, 2.3, 1.7, 85; 425/803

(56) References Cited

U.S. PATENT DOCUMENTS

| | | | |
|---|---|---|---|
| 2,302,918 | * 11/1942 | Smith | 264/2.7 |
| 4,886,866 | * 12/1989 | Braatz et al. | |
| 5,322,649 | * 6/1994 | Rheinish et al. | 264/2.7 |
| 5,679,756 | * 10/1997 | Zhu et al. | |
| 5,908,976 | * 6/1999 | Fujii et al. | |
| 6,015,512 | * 1/2000 | Yang | 264/2.2 |

FOREIGN PATENT DOCUMENTS

| | | |
|---|---|---|
| 63-109044 | 5/1988 | (JP) . |
| 1-258919 | 10/1989 | (JP) . |
| 7-104101 | 4/1995 | (JP) . |
| 8-208792 | 8/1996 | (JP) . |

* cited by examiner

*Primary Examiner*—Mathieu D. Vargot
(74) *Attorney, Agent, or Firm*—Jordan and Hamburg LLP

(57) ABSTRACT

A method of continuously fabricating a lens excellent in various optical characteristics and having no nonuniformity in the characteristics over a total of the lens and a lens fabricated by the method. A first step for forming thiourethane prepolymer and a second step for making thiourethane prepolymer react with at least one urethane forming monomer are carried out in an extruder or in a reactor having an extruding device at a succeeding step, extruded thermoplastic thiourethane-urethane copolymer for optical use is elongated in a sheet-like shape, a lens precursor is formed by punching out the copolymer elongated in a sheet-like shape and the lens precursor is pressed such that a predetermined curved face is provided at least on one face of the lens precursor.

6 Claims, 3 Drawing Sheets

PROCESS METHOD OPTICAL THERMOPLASTIC URETHANE RESIN LENS AND THE LENS

TECHNICAL FIELD

The present invention relates to a production method of thermoplastic sulfur-containing urethane resin and the lens.

BACKGROUND ART

In respect of material for lens, after elapse of the most prevailing age of glass, resin lenses which are transparent and excellent in weather resistance have been developed with development of chemical synthesis and acrylic resin, polycarbonate resin, ADC resin and the like have been in use. However, strict physical properties are required for such lenses over a variety of items of refractive index, aberration, polishing performance, impact resistance, weather resistance, scratch resistance and so on. Above all, in respect of refractive index and aberration, development of excellent resin where the both items are balanced has been positively carried out, resin having a function comparable to glass having refractive index of 1.6 and Abbe's number of 35 or more has been on the market and preferably used particularly for plastic lens for spectacles. Further, in respect of plastic lens for spectacle, excellency in dyeing performance is one of significant factors in pursuit of fashionable performance.

Injection molding process and cast forming process are general as methods of producing lens, particularly plastic lens for spectacles, thermoplastic resin is produced mainly by the injection molding process and thermosetting resin is produced by the cast forming process. Although superiority or inferiority of these production methods is not generally evaluated, there is a difference therebetween at the start point of producing lens in which thermoplastic resin is in a high molecule state and thermosetting resin is in low molecule or so-called monomer state. Further, both of them are injected into a sealed lens forming space. In view of only the production process, the injection molding process is a labor saving process and the cast forming process is labor intensive.

Meanwhile, when attention is paid to refractive index that is one of features of lens, the refractive index of acrylic resin mentioned above is 1.49, that of polycarbonate resin is 1.58, that of ADC resin is 1.50, that of urethane is 1.57 and that of sulfur-containing urethane is 1.67. As methods of forming these resin, the injection molding process is used with respect to acrylic resin and polycarbonate resin and the cast forming process is used for ADC resin and sulfur-containing urethane.

When lens having high optical function can be produced by a process with raw material of high molecular material such as by injection molding, it considerably contributes to promotion of productivity of lens, however, thermosetting resin such as ADC resin and sulfur-containing urethane described above, is provided with a steric crosslinked structure and cannot be made plastic and therefore, the injection molding has not been able to be carried out. Hence, the inventors previously developed optical thermoplastic thiourethane-urethane copolymer containing both of thiourethane bond and urethane bond as a thermoplastic copolymer for optical use and disclosed them in U.S. patent application Ser. No. 08/548,806 and PCT International Application No. PCT/JP96/03710. A description will be given of its outline as follows.

The production process of the thermoplastic copolymer for optical use is characterized in including a first step and a second step. In the first step, diisocyanate and/or diisothiocyanate compound is reacted with thiol compound having two groups reactive with isocyanate group, at least one of which is SH group, to form thiourethane prepolymer having weight-average molecular weight of 1,000 to 30,000. In the second step, thiourethane polymer obtained in the first step and diisocyanate compound are reacted with at least one urethane forming monomer selected from hydroxyl-containing monomers having two groups reactive with isocyanate group at least one of which is OH group. The copolymer obtained by this process is provided with the refractive index of 1.59 or more and Abbe's number of 34 or more, the refractive index and Abbe's number are excellently balanced and various properties required for an optical product such as lens or the like are provided.

Further, although the copolymer can continuously be produced by a reactive extruder, the copolymer is liable to be oxidized since temperature of reaction environment is 140° C. or higher and accordingly, it is preferable to maintain a process of charging raw material and inside of the extruder in an atmosphere of an inert gas such as nitrogen or the like. Further, according to the second step, temperature reaches 180° C. or higher and the environment is in a state where extruded resin is extremely liable to be oxidized and accordingly, it is preferable to place the resin similarly in an inert gas atmosphere until temperature of the copolymer reaches the glass transition temperature of 116° C.

Although lens having excellent optical properties can be obtained from a high molecular material by the development of the thermoplastic copolymer, generally, in the case where lens is produced by the injection molding process, a problem is found that optical nonuniformity is liable to be caused by occurrence of flow line or the like and it becomes apparent that the excellent optical properties of the copolymer cannot be sufficiently utilized by the injection molding process.

The present invention has been carried out in view of the above-described drawbacks and it is an object of the present invention to provide a method of continuously producing a lens which is excellent in various optical properties and which has no nonuniformity in the optical properties over a total of the lens by using optical thermoplastic thiourethane-urethane copolymer containing both of thiourethane bond and urethane bone and a lens produced by the method.

DISCLOSURE OF THE INVENTION

The production method for lens of the present invention includes a first step of forming thiourethane prepolymer and a second step of making the thiourethane prepolymer react with at least one urethane forming monomer, said first and second step being carried out in an extruder or in a reactor having an extruding device at a succeeding step; a step of extending optical thermoplastic thiourethane-urethane copolymer extruded from the extruder or the extruding device in a sheet-like shape; a step of forming a lens precursor by punching out the copolymer extended in the sheet-like shape; and a step of pressing the lens precursor such that a predetermined curved face is provided at least on one face of the lens precursor.

In the above-described fabrication method, it is preferable that the lens precursor is formed in a disk shape.

Further, it is preferable that the first step, the second step and the step of extending the copolymer are carried out in a nitrogen environment.

Further, it is preferable that the lens precursor is heated and annealed and thereafter pressed.

Further, it is possible that the lens precursor is applied with a hard coat film, heated and pressed after providing the predetermined curved face at least on one face thereof.

BEST MODES OF CARRYING OUT THE INVENTION

Next, an explanation will be given of steps of producing optical thermoplastic thiourethane-urethane copolymer (hereinafter, simply referred to as copolymer) according to the present invention and steps of producing a lens using the copolymer in reference to the drawings as follows. Further, the production method shown below is only an example of an embodiment of the present invention and the present invention is not limited thereto.

Figure 1:
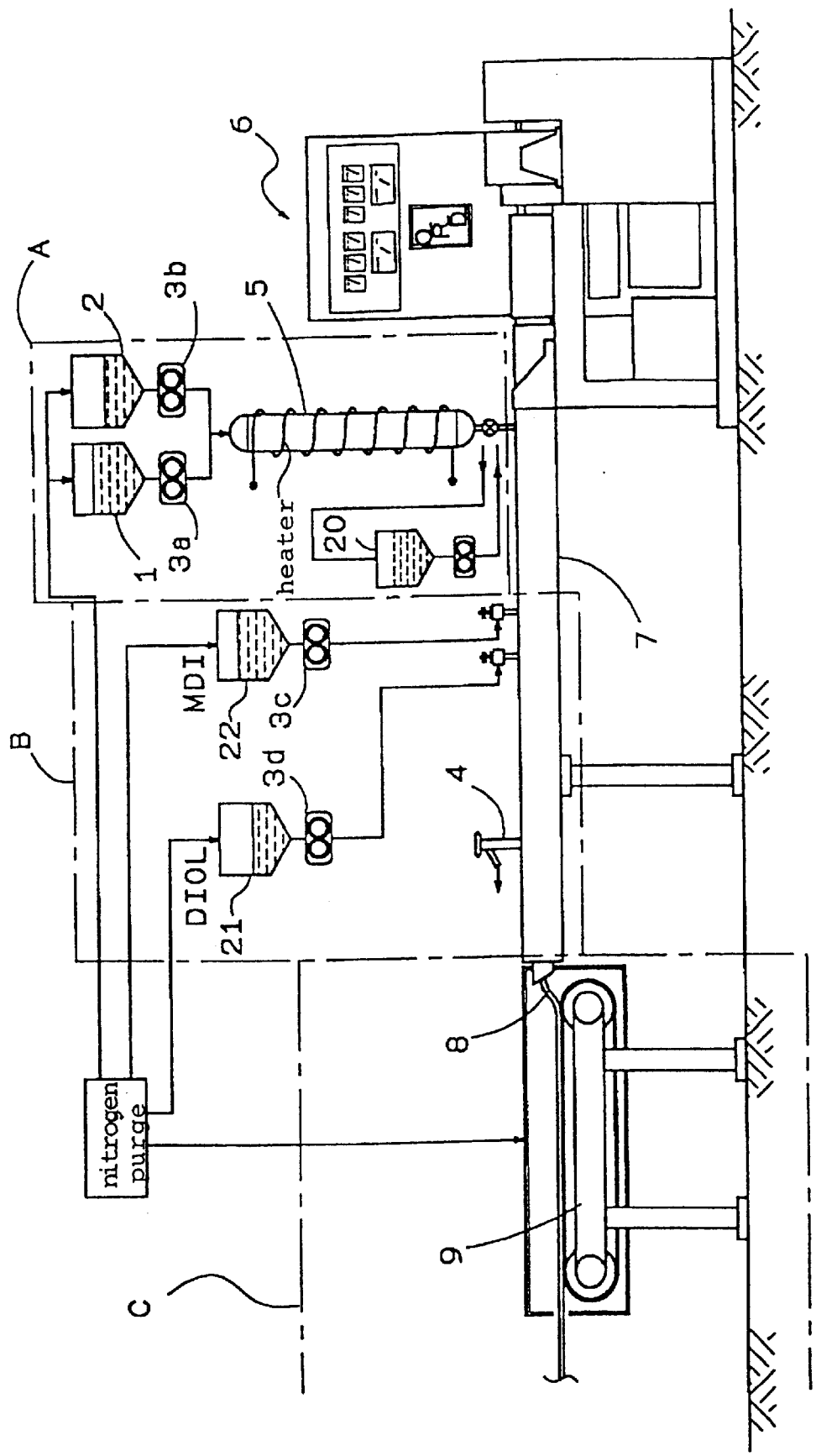
FIG. 1 is an explanatory view of a first step and a second step of the present invention.
Figure 2:
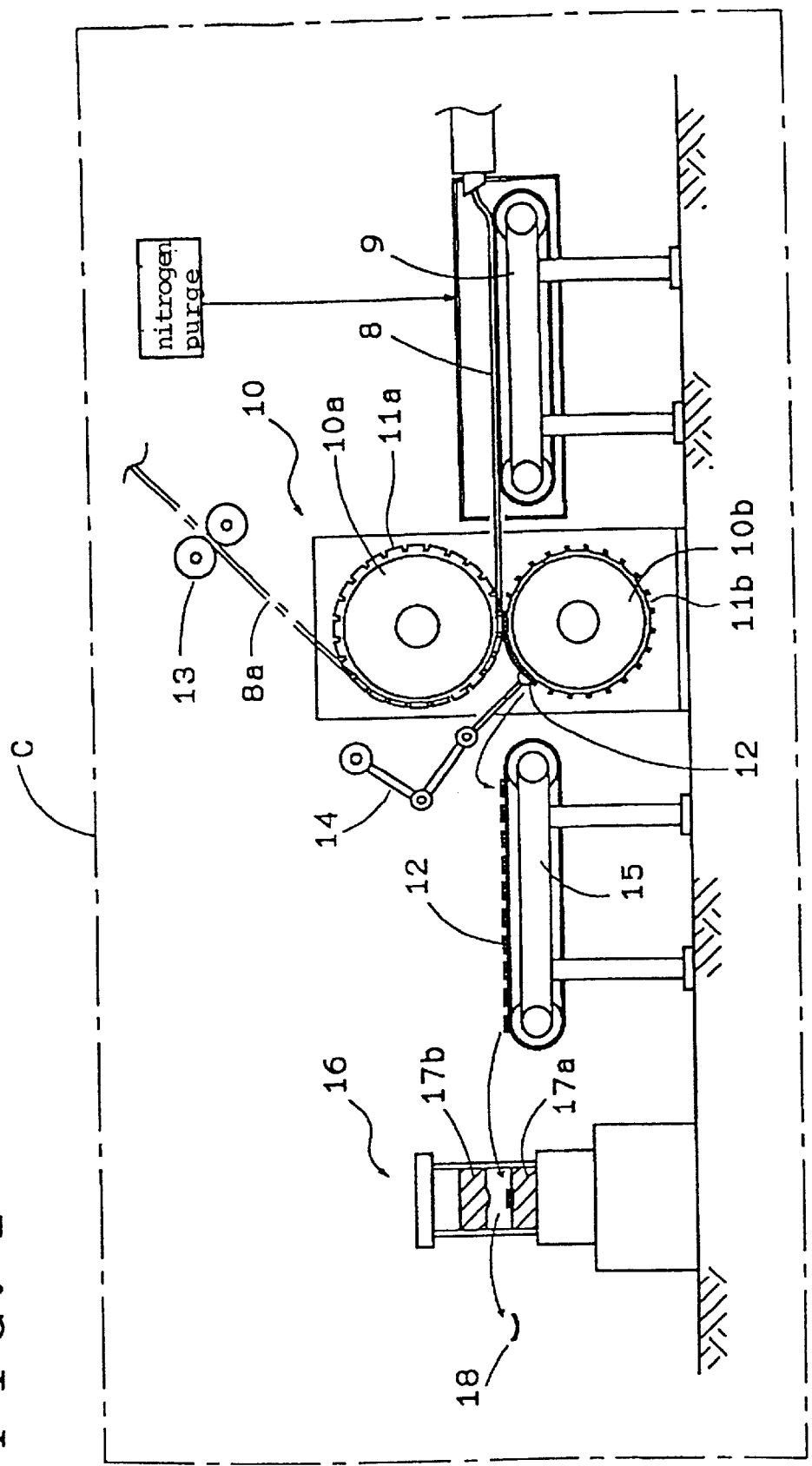
FIG. 2 is an explanatory view of steps of producing a lens according to the present invention.

FIG. 1 shows an integrated process of producing the copolymer. The process is comprised of a first step for producing thiourethane polymer carried out at portion A surrounded by one-dotted chain lines, and a second step for making thiourethane react with hydroxyl group-containing monomer carried out at portion B surrounded by one-dotted chain lines. Further, as shown in FIG. 2, lens producing steps (portion C) are carried out successively.

First, an explanation will be given of the first step carried out at the portion A.

A tank 1 stores diisocyanate and/or diisothiocyanate compound and a tank 2 stores thiol compound under a nitrogen atmosphere.

These tanks are respectively connected with gear pumps 3a and 3b and a delivery ratio of the gear pumps 3a and 3b is adjusted to a predetermined rate. The delivery sides of these pumps are connected to a static mixer 5 provided with heater where the both components are sufficiently mixed. During this period, the solution temperature is maintained at 100° C. or higher and the both components are chemically reacted to form thiourethane prepolymer which is injected into an extruding unit 7 of a reactive extruder 6 having the cylinder bore of 0.8 inch.

In the procedure of injecting thiourethane prepolymer into the extruding unit 7, the prepolymer may be introduced to the extruding unit after being made to flow into a reserve tank 20 for the time being. This is for dealing with the problem of raw material conservation when trouble occurs on the extruding side. Further, thiourethane prepolymer produced in the first step may be produced at a separate reactor and supplied to the extrusion unit.

Thiourethane prepolymer injected into the extruding unit 7 is introduced to portion B of the second step by being transferred under pressure with a screw in a barrel constituting the extruding unit. According to the second step, diisocyanate compound stored in a tank 22 and diol stored in a tank 21 are injected to the extruding unit 7 by gear pumps 3c and 3d at predetermined rates in respect of thiourethane prepolymer produced at the preceding step and polymerized while being mixed and the produced copolymer 8 is extruded. During this period, gas purged by nitrogen are discharged from a discharge plug 4. Further, the above-described second step may be carried out also in a separate reactor vessel and the product may be injected to the extruder.

Figure 3:
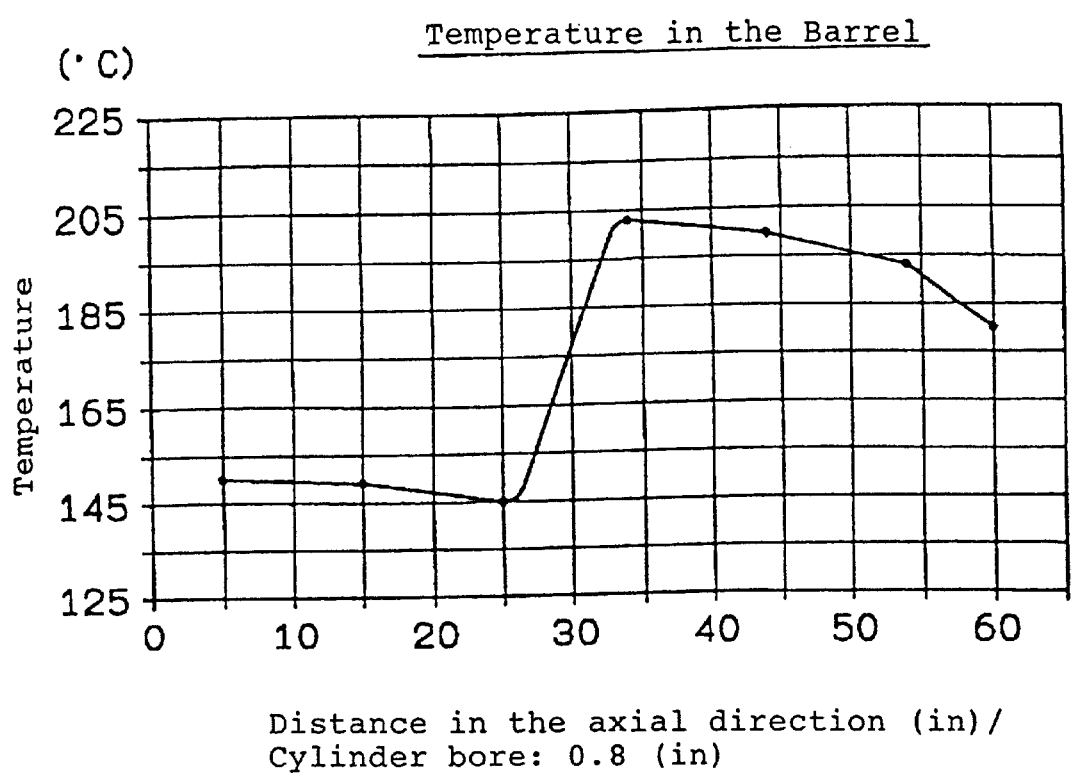
FIG. 3 illustrates a graph indicating temperature situation in a barrel at an extruding unit according to the present invention.

FIG. 3 shows a distance in the axial direction of the barrel of the extruding unit 7 and temperature in the barrel at various portions. A time period from the initial charge of copolymer into the barrel until the extrusion of the product is normally about 20 to 40 minutes.

The copolymer at time point of being extruded is transparent and provided with a fluidity and temperature thereof is about 190° C. At this stage, the copolymer is liable to be oxidized and therefore, it needs to be gradually cooled under a nitrogen gas environment and the copolymer 8 is continuously charged onto a conveyer 9 surrounded by nitrogen gas. The glass transition temperature of the copolymer 8 is 116° C. and therefore, in consideration of handling at the lens production steps, the length of the conveyer 9 and the nitrogen gas temperature are adjusted such that the temperature of the copolymer 8 at an outlet side of the conveyer 9 is 100° C. to 130° C.

Although not illustrated, it is preferable to design a die installed at a final end of the extruding unit 7 such that the copolymer at the outlet side of the conveyer 9 is provided with a width of about 85 mm and a thickness of about 5 to 10 mm. Further, in respect of the speed of the conveyer, it is a speed a little faster than the extruding speed such that the copolymer extruded from the extruding unit is elongated by which the copolymer is monoaxially elongated and the molecular orientation is controlled in a constant direction. Further, it is preferable that the surface of a conveyer belt of the conveyer 9 is a mirror finish face and polished stainless steel material may be used. And the mold detachment performance may be promoted further by coating fluorine resin.

Next, an explanation will be given of steps of producing lens in reference to FIG. 2.

A rotary puncher 10 is installed at an outlet side of the conveyer 9, pluralities of punch dies 11a and reception dies 11b are provided on peripheries of drums 10a and 10b respectively correspondingly and the drums can continuously punch out lens precursors 12 while being rotated in synchronism with the feed speed of the copolymer 8 in a sheet-like shape. The sheet-like shape copolymer 8a which has been finished with punch out operation is rotated while being adhered to the drum 10a and cut at pertinent lengths in the midway and stored. Reference numeral 13 designates take-up rollers. The punched-out lens precursors 12 are arranged on a conveyer 15 by a robot hand 14 having suction portions. The conveyer 15 is for transferring the lens precursor 12 to a press machine 16 and the lens precursors are individually set at a predetermined position of the press machine 16 manually or by a robot hand.

Dies 17a and 17b of the press machines 16 are provided with an equipment capable of carrying out both heating and cooling. The temperature of the lens precursor during this period is naturally cooled down to about 100° C. and therefore, it is heated to 150° C. or higher again on the lower die 17a of the press machine 16. Thereafter, the die 17b is lowered and the lens precursor 12 is pressed to provide a lens 18.

The lens precursor 12 is in a disc-like shape normally having the diameter of about 80 mm and the thickness about 5 to 10 mm and can be formed in either of a minus lens and a plus lens by pressing. A lens for a spectacle is in a meniscus shape and therefore, in pressing by using dies, resin flows uniformly from the central portion to the outer side and no weld line is caused.

After pressing, the lens is taken out after being cooled at least to the glass transition point or lower.

Further, although in the above-described example, the lens precursor 12 is formed by being punched out in a disc-like shape by the pressing machine from the copolymer 8 elongated in a sheet-like shape, in order to prevent loss of material, the copolymer 8 extruded on the conveyer 9 may be cut in a cubic shape or a square plate shape having a volume necessary for forming the lens and elongated into a rounded shape to thereby form the lens precursor. However, in the elongating operation, caution is required such that uniform elongation is carried out in a direction from the central portion of a lump of the copolymer to the outer side.

Although it is a general process to form a hard coat film on the produced lens thereafter by a pertinent method of dipping or spinning or the like and thermally drying it, as another process, after drying to touch, the lens may again be heated and pressed to dry the hard coat film and improve adhesion performance. In that case, the radius of curvature of the lens may more or less be modified.

According to this production method, a half product lens, that is, a product in a state of the lens precursor 8 in a disc-like shape may be stored and a finished product may be obtained by pressing and polishing the semi-finished lens thereafter in compliance with order.

In the case of the semi-finished lens, the thickness of the sheet of the copolymer 8a is set to about 15 to 20 mm. Further, in pressing the semi-finished lens, either of the lower die and the upper die is constituted by a finely formed face.

Although according to the conventional cast forming process, material is stocked by being formed in spherical faces having several tens kinds of radii of curvature, according to the present invention, material is stored as the lens precursor and a finished product can be fabricated at order and therefore, there is achieved an advantage where stock of many kinds is not needed. However, it is preferable to store the lens precursor 8 after annealing it for 20 to 120 minutes at 120° C. to 150° C. to ensure stability of resin.

EXAMPLES

Although a further specific explanation will be given of the present invention by using examples as follows, the present invention is not limited thereto.

The tank 1 shown in FIG. 1 stored a mixed solution where 4, 4'-methylene bis (cyclohexyl isocianate) and 1, 3-bis (isocianato methyl) benzene were mixed at a ratio of 95 to 5 (in weight ratio) and the tank 2 stored bis (2-melcaptoethyl) sulfide respectively under a nitrogen atmosphere and the ratio of delivery amounts of the gear pumps 3a and 3b was adjusted to 5 to 3. The both components were agitated and reacted with each other while maintaining the solution temperature at 110° C. by the static mixer 5 provided with heater and produced thiourethane prepolymer was injected into the extruding unit 7 of the reactive extrusion machine 6 having the cylinder bore of 0.8 inch.

In respect of 65 g/min (indicating an amount of injection per minute, hereinafter the same) of thiourethane prepolymer injected into the extruding unit 7, 20 g/min of MDI (4, 4'-methylene bis phenyl isocianate) stored in the tank 22 and 12 g/min of diol (cyclohexane dimethanol) stored in the tank 21 were injected by the gear pumps 3c and 3d, polymerizing reaction was carried out while mixing them and the produced copolymer 8 was extruded.

Incidentally, it took 20 minutes for the product to be extruded since thiourethane prepolymer was initially charged into the barrel of the extruding unit 7.

While gradually cooling the extruded copolymer under a nitrogen atmosphere, the copolymer was continuously charged onto the conveyer 9 and was elongated in a sheet-like shape having the width of 85 mm and the thickness of about 1 cm. The length of the conveyer 9 was 70 cm and the velocity was 10 cm/min and the temperature of the copolymer 8 at the outlet side of the conveyer 9 was 120° C.

The lens precursor 12 in a disc-like shape having the diameter of 80 mm and the thickness of about 1 cm was punched out by the rotary punching machine 10 shown in FIG. 2 from the copolymer elongated in a sheet-like shape at the outlet side of the conveyer 9. The produced lens precursor 12 was arranged on the conveyer 15 by the robot hand 14.

After heating the lens precursor 12 to 180° C. on the lower die 17a of the press machine 16, the die 17b was lowered to press and the lens 18 was obtained.

After cooling, when the optical characteristics of the lens 18 were investigated, the refractive index was 1.59 and Abbe's number was 35 and no optical nonuniformity was found to occur.

INDUSTRIAL APPLICABILITY

According to the fabrication method of the present invention described above, a lens having the refractive index of 1.59 or more and Abbe's number of 34 or more, having no optical nonuniformity and well balanced to be used for spectacles can continuously be produced. Further, the material can be stored as a lens precursor at a prestage of producing a finished lens and quick response can be made to demand of lens on the market. Further, in respect of a finished lens, the radius of curvature can more or less be modified while simultaneously carrying out formation of a hard coat film and an annealing step and therefore, many kinds of lenses need not to be stocked and burden of a manufacturer can be reduced.

What is claimed is:

1. Production method for a lens comprising;
a first step of forming thiourethane prepolymer and a second step of making the thiourethane prepolymer react with at least one urethane forming monomer, said first step and said second step being carried out in an extruder or in a reactor having an extruding device at a succeeding step,
a step of extending optical thermoplastic thiourethane-urethane copolymer extruded from the extruder or the extruding device in a sheet shape,
a step of forming a lens precursor by punching out the copolymer extended in the sheet shape and
a step of pressing said lens precursor such that a predetermined curved face is provided at least on one face of the lens precursor.

2. Production method for lens as claimed in claim 1, wherein said lens precursor is formed in a disk shape.

3. Production method for lens as claimed in claim 1 or 2, wherein said first step, second step and the step of extending the copolymer are carried out in a nitrogen environment.

4. Production method for lens as claimed in claim 1 or 2, wherein said lens precursor is heated and annealed and thereafter pressed.

5. Production method for lens as claimed in claim 1 or 2, wherein said lens precursor is applied with a hard coat film, heated and pressed after providing said predetermined curved face at least on one face thereof.

6. Production method for a lens comprising;
a step of extending optical thermoplastic polymer extruded from an extruder or an extruding device in a sheet shape,
a step of forming a lens precursor by punching out the polymer extended in the sheet shape and
a step of pressing said lens precursor such that a predetermined curved face is provided at least on one face of the lens precursor.

* * * * *

UNITED STATES PATENT AND TRADEMARK OFFICE
CERTIFICATE OF CORRECTION

PATENT NO.    : 6,309,568 B1
DATED         : October 30, 2001
INVENTOR(S)   : Zhou Yang et al.

It is certified that error appears in the above-identified patent and that said Letters Patent is hereby corrected as shown below:

<u>Title page,</u>
Item [73], Assignees, please change the city of the second assignee, "Optima Inc.," from "Milford" to -- Stratford --.

Signed and Sealed this

Fifteenth Day of October, 2002

*Attest:*

*Attesting Officer*

JAMES E. ROGAN
*Director of the United States Patent and Trademark Office*